Patented Oct. 8, 1929

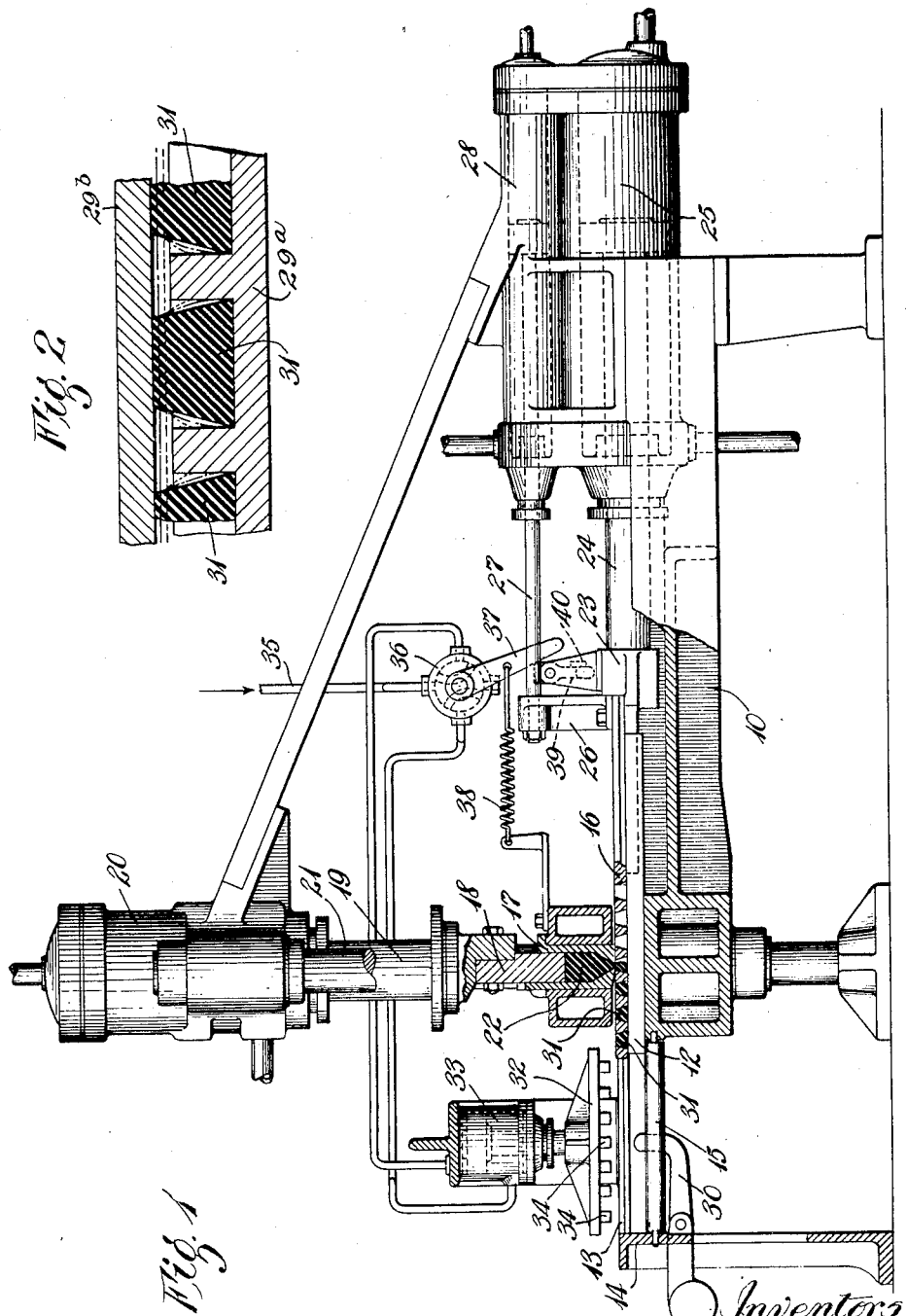

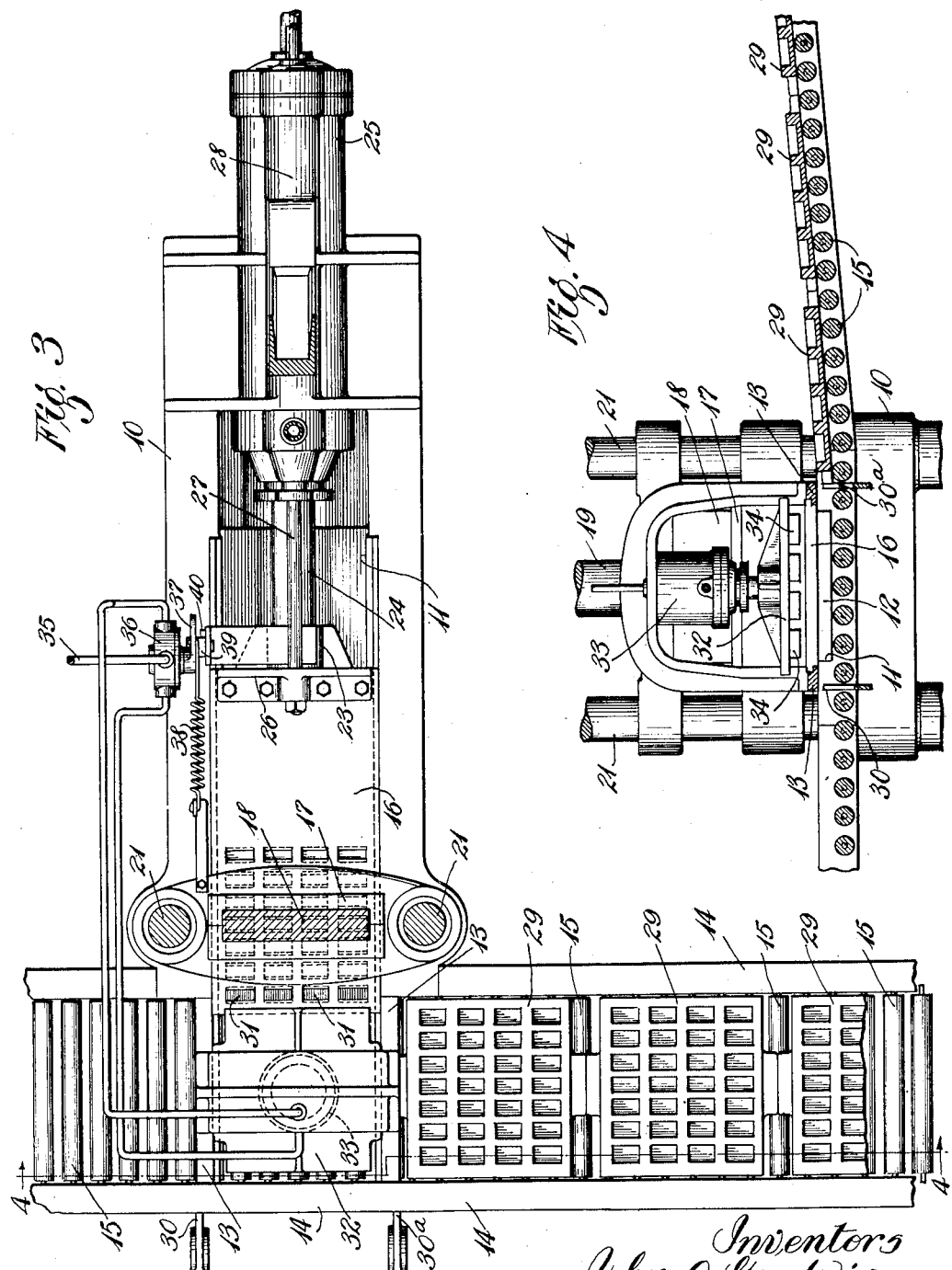

1,731,006

UNITED STATES PATENT OFFICE

JOHN O. GOODWIN AND CHARLES W. LEGUILLON, OF AKRON, OHIO, ASSIGNORS TO THE B. F. GOODRICH COMPANY, OF NEW YORK, N. Y., A CORPORATION OF NEW YORK

MOLDING APPARATUS

Application filed April 6, 1928. Serial No. 267,880.

This invention relates to apparatus for molding articles of plastic material and especially small articles, such as rubber shoe-heels, porcelain insulators, or the like, which are manufactured in large numbers.

Heretofore it has been proposed to form moldable blanks for rubber heels by forcing the plastic stock from an extruding machine into a single file of through apertures formed in a plate rotated between the delivery nozzle of the extruding machine and a backing plate adapted to confine the stock in the aperture of the plate until it has been sheared off from the supply mass of stock by being forced laterally from the nozzle of the extruding machine, the blanks in succession being dislodged from the rotating plate in which they are formed by means of a star-wheel mounted at a suitable position in the orbit of the plate.

In such procedure and apparatus, however, the blanks would require individual handling for placing them in vulcanizing molds, as to blanks of rubber composition, and as to clay articles given their final form by extrusion into a molding cavity the rough treatment incident to knocking them from their cavities by means of a star-wheel would deform them. The relative movement of the molding plate past the backing plate while the stock in the molding plate is under full molding pressure would also result in excess leakage into the space between the sliding surfaces of the two and would result in excessive abrasion of the surfaces and high power consumption, as well as increase of leakage.

One of our chief objects is to provide for the convenient and economical handling of articles that have been given their final form by extrusion of stock into mold cavities, as in transferring molded clay products, in their plastic state, from the mold in which they are formed onto firing trays or into saggers, or placing molded blanks of rubber composition in the cavities of vulcanizing molds. A further object is to provide for so tranferring the blanks or molded articles without deforming them and for concurrently depositing a large number of them in accurately spaced apart relation. Another object is to provide for conveniently filling a mold cavity with stock and putting it under high pressure therein without substantial entrapping of air and without much overflow of stock from the cavity in the closing of the mold sections.

Of the accompanying drawings:

Fig. 1 is a side elevation, with parts broken away and in section, of apparatus embodying and adapted to carry out our invention in its preferred form.

Fig. 2 is a fragmentary, sectional view of a vulcanizing mold and a moldable blank therein illustrating one feature of our invention.

Fig. 3 is a plan view of the device with parts sectioned and removed.

Fig. 4 is a section of parts of the apparatus on line 4—4 of Fig. 3.

Referring to the drawings, the apparatus comprises a table 10 formed in its upper face with a guide-way 11 (Fig. 4) for a mold-bottom plate or slide 12. A pair of guide rails 13, 13 are mounted upon the table on the opposite sides of the guide-way 11 and extend from one end of the table to one of the side rails 14 of a roller-type conveyor 15, the rails 13 being adapted to support and to guide into position over the conveyor 15 a through-apertured multiple-cavity mold member 16 having rabbeted side edges slidably fitting between and upon the rails.

Mounted over the table 10 in position for filling the mold 16 by extrusion of plastic stock thereinto as the mold moves upon the rails 13 is an extrusion device which comprises, when designed for the extrusion of heat plastic material such as a rubber composition, a steam-jacketed extrusion chamber 17 and a plunger 18 adapted to act as a piston in the extrusion chamber and secured to the piston rod 19 of a double-acting fluid-pressure cylinder 20 mounted over the extrusion chamber upon vertical standards or die rods 21, 21 formed as upward extensions of two of the table legs, the plunger 18 being adapted to be lifted clear of the extrusion chamber to admit the placing of the plastic stock 22 therein.

For reciprocating the slide or bottom-plate 12 under the extrusion chamber and to and from a position over the conveyor 15, the slide is secured to a head 23 mounted upon the end of the piston rod 24 of a double-acting cylinder 25 mounted upon the table. The mold 16 is slidably mounted upon the bottom-plate or slide 12 and is adapted to be abutted by the head 23 and thus to be shoved forward past the extrusion device by the force of the cylinder 25.

For holding the mold 16 over the conveyor 15 while the slide 12 is withdrawn from under it by the cylinder 25, and for subsequently retracting the mold, a bracket 26 is secured to and rises from the end of the mold adjacent the head 23 and is secured to the end of the piston rod 27 of a double-acting fluid-pressure cylinder 28 disposed parallel to and just over the cylinder 25.

The conveyor 15 is adapted for conveying a succession of article-receiving members 29, 29, which may be vulcanizing molds for rubber articles or saggers or firing trays for porcelain products, to a position where they will be under and in registry with the mold 16 when the latter, supported upon the side rails 14, is in its most advanced position, and the conveyor 15 is provided with a counterweighted, depressible stop 30 for so positioning the successive receiving members 29. The conveyor also is provided with a counterweighted detent device 30ᵃ for releasably holding back from the advanced position of the mold 16 a succession of the receiving members 29 resting upon the adjacent inclined reach of the conveyor 15, as shown in Fig. 4.

For gently forcing the mold blanks or articles 31, 31 downward out of the respective cavities of the mold 16 and depositing them in orderly arrangement in or upon the receiving members 29, an ejector head 32 is secured upon the lower end of the piston rod of a vertical double-acting fluid-pressure cylinder 33 and the head 32 is formed on its lower face with a plurality of downwardly projecting plungers 34, 34 so spaced apart as to register with the respective cavities or through apertures of the mold 16 when the latter is in its most advanced position, the plungers 34 being adapted to force the molded articles or blanks 31 from the mold 16 onto or into the receiving member 29.

In the case of a mold adapted for the forming of moldable blanks of rubber composition or the like the mold is preferably formed as here shown with downwardly flared molding apertures or cavities 16ᵃ, 16ᵃ, which not only results in easy and clean removal of the blanks from the cavities by the plungers 34 but also results in forming a blank having a desirable shape for subsequent molding and vulcanizing in a mold receiving the blanks from the mold 16, as is shown in Fig. 2, where one of the moldable blanks 31 is shown in position between a vulcanizing mold 29ᵃ and a cover plate 29ᵇ therefor.

For automatically actuating the head 32 with its set of plungers 34 the two ends of the cylinder 33 are connected with a pressure fluid supply line 35 through a four-way valve 36 having a control lever 37 connected with a part of the frame by a pull spring 38 adapted to urge the lever 37 toward a position such that the lower end of the cylinder 33 will be charged and the head 32 thus held in its uppermost position. For reversing the valve 36 to force the head 32 downward while the mold 16 remains under it, a weighted pawl 39 is pivoted on the head 23 and provided with a stop 40 formed on the head to cause the pawl to force the lever 37 to the right as viewed in Fig. 1 in the return stroke of the piston rod 24, the angular movement of the lever 37 permitting the pawl 39 to pass from the outer end of the lever and release it near the end of the return stroke of the piston rod 24, so that the spring 38 will return the lever 37 to its original position and thus cause the plungers 34 to be lifted clear of the mold 16 after their downward, stock-discharging stroke. The pawl 39 is adapted to be turned on its pivot by contact with the lever 37 in the forward stroke of the piston rod 24 and thus to pass to the forward side of the lever 37 for driving engagement therewith upon the return stroke of the piston rod.

In the operation of the apparatus, the extrusion chamber 17 containing a charge of the plastic stock 22 and the mold 16 and its bottom-plate or slide 12 being in their retracted positions, with the leading margin of the mold 16 closing the extrusion aperture of the chamber 17 and the plunger 18 being urged strongly downward by the cylinder 20, the mold 16 and bottom-plate 12 are moved forward together by means of the cylinder 25 and as each mold cavity 16ᵃ comes into communication with the extrusion aperture it is filled with the plastic stock by extrusion from the chamber and the stock within the cavity is sheared off from the supply mass as the cavity passes out of communication with the chamber.

When the mold 16 and bottom-plate 12 have moved to the position under the ejector head 32, where the mold 16 is stopped by contact with the side rail 14 of the conveyor, the rear end of the cylinder 28 is charged to hold the mold 16 in such position and the cylinder 25 is reversed to withdraw the bottom-plate 12 from under the mold. In the return movement of the structure including the bottom-plate 12 and the head 23 the pawl 39 reverses the valve 36 and causes the ejector head 32 to descend and punch the molded blanks or articles 31 from the mold 16 into or onto the receiving member 29, which receives them in orderly spaced-apart relation and, in the case of a vulcanizing mold, receives each blank properly positioned in its respective molding cavity.

In Fig. 2 is shown one of the frusto-conical blanks 31 so positioned in the cavity of a vulcanizing mold 29ª, ready to be compacted in the mold cavity by the closing of a cover plate 29ᵇ upon the mold. The shape of the blank 31 is such that as the cover plate 29ᵇ is forced downward the lateral bulging of the blank under the force of the cover plate will result in a filling out of the mold cavity as indicated by the series of dotted lines, the rubber composition contacting with the side walls of the cavity progressively, so that air is expelled from the cavity in advance of the spreading rubber and the rubber does not rise in contact with the side walls to the top of the cavity until the cover plate is almost completely closed upon the mold, when the blank of the shape shown is of such volume as to fill the mold cavity with but little excess. Consequently the stock can be thoroughly compressed in the mold cavity without entrapping of air and with little or no overflow of stock from the cavity in the closing of the mold.

After the blanks or articles have been dislodged as described from the mold 16 and the head 32 has been raised, as above described, the cylinder 28 is reversed and the mold 16 is thus retracted to its starting position over the retracted slide 12, in readiness for a repetition of the mold-filling operation as described.

The procedure and apparatus as described are such as to provide the advantages set forth in the above statement of objects and our invention is susceptible of modification within its scope as defined in the appended claims.

We claim:

1. Molding apparatus comprising an extrusion device, a through-apertured, multiple-cavity mold, means for moving the mold past the extrusion device with mouths of the cavities in stock-receiving relation thereto to fill the cavities of the mold with determinate units of stock, closure means for maintaining the opposite mouths of the cavities closed during such movement of the mold, the said closure means being relatively movable from its cavity-closing position, means positioned adjacent the path of the mold for concurrently dislodging a plurality of the units of stock from the mold cavities, and means for receiving and supporting the said units, as they are so dislodged, in the relative positions which they occupied in the mold.

2. Molding apparatus comprising an extrusion device, a through-apertured, multiple-cavity mold, means for moving the mold past the extrusion device with mouths of the cavities in stock-receiving relation thereto to fill the cavities of the mold with determinate units of stock, closure means for maintaining the opposite mouths of the cavities closed during such movement of the mold, the said closure means being relatively movable from its cavity-closing position, means positioned adjacent the path of the mold for concurrently dislodging a plurality of the units of stock from the mold cavities, and means for receiving and supporting the said units, as they are so dislodged, in the relative positions which they occupied in the mold, the dislodging means comprising a plurality of plungers, a common mounting therefor, and means timed with the mold-moving means for actuating the said mounting.

3. Molding apparatus comprising an extrusion device, a through-apertured, multiple-cavity mold, means for moving the mold past the extrusion device with mouths of the cavities in stock-receiving relation thereto to fill the cavities of the mold with determinate units of stock, closure means for maintaining the opposite mouths of the cavities closed during such movement of the mold, the said closure means being relatively movable from its cavity-closing position, means positioned adjacent the path of the mold for dislodging the units of stock from the mold cavities, and means for receiving and supporting the said units, as they are so dislodged, in the relative positions which they occupied in the mold.

4. Apparatus as defined in claim 3 in which the mold cavities are flared from the stock-receiving face to the opposite face of the mold.

5. Molding apparatus comprising an extrusion device, a through-apertured, multiple-cavity mold, a closure member for the cavities at one face of the mold, and means for moving the mold and the closure member at the same speed past the extrusion device in stock-receiving relation thereto and for subsequently effecting relative movement between the mold and the closure member to open the mold cavities.

In witness whereof we have hereunto set our hands this 2nd day of April, 1928.

JOHN O. GOODWIN.
CHARLES W. LEGUILLON.